United States Patent Office 3,049,404
Patented Aug. 14, 1962

---

3,049,404
METHOD OF MAKING FERROMAGNETIC BARIUM FERRITES
William L. Wade, Jr., Neptune, N.J., assignor to the United States of America as represented by the Secretary of the Army
No Drawing. Filed Feb. 3, 1960, Ser. No. 6,571
7 Claims. (Cl. 23—50)
(Granted under Title 35, U.S. Code (1952), sec. 266)

The invention described herein may be manufactured and used by or for the Government for governmental purposes without the payment of any royalty thereon.

This invention relates to methods of making ferromagnetic barium ferrites of extremely high structural and compositional purity.

The usefulness of barium ferrites in electronic devices depends on its structural and compositional purity which in turn depends on the chemical purity of the starting materials and the exact controllability of the manufacturing process. The control of the manufacturing process is particularly important for the reproducibility of the properties of the finished material. Both the structural and compositional properties must be controllable to permit the recreation of properties within the narrow limits necessary for application of the barium ferrites in electronic devices and more particularly in microwave devices.

Heretofore barium ferrite has been made commercially by conventional ceramic processing methods for oxide materials. The barium oxide or barium carbonate and the ferric oxide are mixed in finely ground form with water in a steel ball mill for a considerable length of time up to about twenty hours to obtain thorough mixing of the oxides. To minimize the introduction of impurities, a rubber lined mill with stainless steel balls is often employed which, however, only minimizes but does not exclude all impurities. After milling, the homogeneous oxide mixtures are dried usually after pressure-filtering and the dried material is then presintered and finally fired at an appropriate firing temperature.

It is extremely difficult to obtain by the ball milling process a particle size below 0.1 micron and it is also difficult to obtain by this method a completely homogeneous particle size. These two factors in addition to the impurities which are necessarily introduced into the material by ball milling greatly decrease the effectiveness of ferromagnetic barium ferrite in microwave devices.

I now have found that ferromagnetic barium ferrites of extremely high structural and compositional purity can be obtained by dissolving iron chloride ($FeCl_3$) in an organic solvent solution of an alcohol at room temperatures under anhydrous conditions, treating this solution with anhydrous ammonia gas to precipitate all of the chlorides as ammonium chloride, separating the iron alcoholate solution from the precipitate and reacting it in stoichiometric proportions with barium alcoholate. Since barium ferrite has the formula $BaFe_{12}O_{19}$ or $BaO \cdot 6Fe_2O_3$ the barium alcoholate should be reacted with the ferric alcoholate in such amounts that 1 mol of barium is present for 12 mols of iron according to the reaction $$BaO + 6Fe_2O_3 = BaFe_{12}O_{19} \text{ (or } BaO \cdot 6Fe_2O_3)$$

By controlling the temperature of the reaction it is possible to control the particle size of the crystals. After evaporating the solution to dryness by distillation the remaining mixture of barium oxide and ferric oxide is thoroughly dried and fired at temperatures between about 960° C. and 1260° C. to obtain an extremely homogeneous barium ferrite having a particle size considerably below 0.1 micron.

The invention will become more apparent from the following description of specific embodiments.

*Example 1*

Ferric ethylate is first made by dissolving 30 gms. of anhydrous ferric chloride ($FeCl_3$) in a mixture of 250 cc. of ethyl alcohol and 250 cc. of benzene ($C_6H_6$) at room temperature under anhydrous conditions. The mixture is stirred under anhydrous conditions for about 1 to 4 hours until most of the ferric chloride is in solution. This solution which now contains about 0.01 to 0.02 gm. of iron in 1 cc. is now treated with anhydrous ammonia gas which is bubbled thru the solution at room temperature for about 4 to 6 hours to precipitate all the chlorides as ammonium chloride along with some of the iron in the form of some probably organic compounds. The solution is allowed to stand for about twelve hours until the precipitate is settled down and tests of the clear supernatant liquid show the absence of chlorides. If chlorides should still be present the treatment with ammonia gas is continued. After the precipitate has settled and after tests have shown the absence of chlorides in the supernatant liquid, it is drawn off and filtered in vacuum under anhydrous conditions. After filtration the solution is concentrated, for instance, by heating under atmospheric pressure to about the boiling point of benzene (between 80 to 86° C.) whereby excess of ammonia, benzene and ethyl alcohol is driven off. The remaining solution of ferric ethylate in ethyl alcohol and benzene was analyzed for iron content which in this example was found to be 0.0083 gm. of iron per cc. of liquid and this solution was used in the following way:

500 cc. of the above-mentioned ferric ethylate solution containing 0.0083 gm. of iron per cc. is reacted with 10.2 cc. of barium methylate containing 0.0838 gm. of barium per cc. This ratio corresponds to 12 mol of iron to 1 mol of barium since the above-mentioned amount of 500 cc. of ferric ethylate contains 4.15 gms. of iron and the above-mentioned 10.2 cc. of barium methylate contains 0.8521 gm. of barium. The mixture is then evaporated to dryness by distillation at temperatures between 80 to 86° C. and the resulting very fine powder is thoroughly dried, preferably at about 100° C., for example, on a steam bath resulting in a stoichiometric, extremely pure and homogeneous mixture of barium oxide and ferric oxide in the mol ratio of 1 mol of barium to 12 mol of iron. On firing this mixture at temperatures between 960° C. and 1260° C. a ferro magnetic barium ferrite of extremely high structural and compositional purity is attained showing a very homogeneous crystal size of less than 0.1 micron.

The powder may be formed before firing into any desired shape and then fired. For example, the above-described powder after drying on a steam bath at 100° C. was pressed in a stainless steel mold at room temperature under a pressure of about 10,000 p.s.i. into a disc of one-half inch in diameter and one-quarter inch in thickness. The pressed disc was then removed from the mold and fired for 1 hour at about 960° C. The resulting barium ferrite disc showed excellent ferromagnetic properties.

*Example 2*

Ferric ethylate was made in the manner described in Example 1 but using toluene instead of benzene. 600 cc. of the resulting solution which contained 0.0109 gm. of iron per cc. was added to 29 cc. of barium methylate solution containing 0.0611 gm. of barium per cc. This mixture corresponds to a ratio of 1 mol of barium to 12 mol of iron. The solution was then treated as in Example 1. After evaporating to dryness the resulting finely dispersed material was fired at about 1000° C. to yield a very homogeneous, finely powdered barium ferrite of great structural and compositional purity having a particle size of less than 0.1 micron. X-ray diffraction studies and magnetization saturation tests confirmed the presence of inherently special properties of this material for use as a permanent magnet material.

Similar examples may be carried out using instead of iron ethylate, other ferric alcoholates such as the methylate, by reacting the ferric chloride with methyl alcohol, either in mixture with benzene or with toluene or with xylene. Also, instead of barium methylate other barium alcoholates (such as the ethylate, butylate or isobutylate) may be used for the reaction with ferric alcoholates.

It will be evident to those skilled in the art that many modifications and variations of this process may be carried out without departing from the spirit of the invention as defined in the following claims.

What is claimed is:

1. The method of making ferromagnetic barium ferrite of high structural and compositional purity and having a particle size below 0.1 micron comprising;

dissolving anhydrous ferric chloride in an organic solvent solution of an alcohol the alcohol radical of which contains not over 5 carbon atoms and a cyclic hydrocarbon at room temperature under anhydrous conditions, stirring the mixture under anhydrous conditions for several hours to dissolve most of the ferric chloride, treating the solution with anhydrous ammonia gas at room temperature for several hours to precipitate all the chlorides as ammonium chloride, allowing the treated solution to stand for several hours until the precipitate is settled, drawing off the supernatant liquid and filtering it in vacuum under anhydrous conditions, concentrating the filtered solution by heating under atmospheric pressure to about the boiling point of the cyclic hydrocarbon to remove excess amounts of the solvents, mixing the ferric alcoholate thus obtained in stoichiometric proportions and in an organic solvent with barium alcoholate the alcohol radical of which contains not over 5 carbon atoms, heating the solution to dryness to obtain a mixture of barium oxide and ferric oxide in the ratio of 1 mol of barium to 12 mol of iron and firing this mixture at temperatures of between 960 and 1260° C. to obtain ferromagnetic barium ferrite.

2. The method of making ferromagnetic barium ferrite according to claim 1 wherein the alcohol of the organic solvent solution in which the ferric chloride is dissolved is an alcohol selected from the group consisting of methyl alcohol and ethyl alcohol.

3. The method of making ferromagnetic barium ferrite according to claim 1 in which the organic solvent for the ferric chloride is a mixture of an aliphatic alcohol with a cyclic hydrocarbon selected from the group consisting of benzene, toluene, and xylene.

4. The method of making ferromagnetic barium ferrites according to claim 1 in which the mixture of ferric alcoholate and barium alcoholate is evaporated to dryness by distillation at temperatures between 80 to 86° C.

5. The method of making ferromagnetic barium ferrites according to claim 1 in which a solution of ferric chloride in ethyl alcohol and benzene from which chloride has been removed by precipitation with anhydrous ammonia gas is mixed with stoichiometric proportions of barium methylate whereupon the mixture is evaporated to dryness by distillation at temperatures between 80 to 86° C. and the resulting powder is thoroughly dried at about 100° C. whereupon the resulting solid mixture of barium oxide and ferric oxide is fired at about 960° C.

6. The method of making ferromagnetic barium ferrites according to claim 5 in which the dried solid mixture of barium oxide and ferric oxide powder is pressed at room temperature in a stainless steel mold to the desired shape whereupon the formed piece is removed from the mold and fired for one hour at 960° C.

7. The method of making ferromagnetic barium ferrites according to claim 1 in which ferric ethylate is made by dissolving ferric chloride in a mixture of ethyl alcohol and benzene and the chloride removed by precipitation with anhydrous ammonia gas.

References Cited in the file of this patent

UNITED STATES PATENTS

| | | |
|---|---|---|
| 2,762,777 | Went et al. | Sept. 11, 1956 |
| 2,854,412 | Brockmon et al. | Sept. 30, 1958 |
| 2,927,896 | Bergmann | Mar. 8, 1960 |
| 2,955,085 | Jonker et al. | Oct. 4, 1960 |

FOREIGN PATENTS

| | | |
|---|---|---|
| 644,639 | Great Britain | Oct. 18, 1950 |
| 688,769 | Great Britain | Mar. 11, 1953 |
| 1,048,444 | France | Aug. 5, 1953 |
| 569,081 | Canada | Jan. 13, 1959 |

OTHER REFERENCES

Mellor: "Comprehensive Treatise on Inorganic and Theoretical Chemistry," Longmans, Green and Co., N.Y., 1934, vol. 13, pt. 2, pages 913 and 914.

Haslam: "Chem. Abs.," vol. 52, col. 10143, June 25, 1958.